(12) United States Patent
Zhang et al.

(10) Patent No.: US 12,519,534 B2
(45) Date of Patent: Jan. 6, 2026

(54) SYSTEMS AND METHODS FOR BEAM FAILURE RECOVERY FOR MULTI-DCI MODE

(71) Applicant: APPLE INC., Cupertino, CA (US)

(72) Inventors: Yushu Zhang, Beijing (CN); Chunhai Yao, Beijing (CN); Dawei Zhang, Saratoga, CA (US); Haitong Sun, Cupertino, CA (US); Hong He, Cupertino, CA (US); Wei Zeng, Saratoga, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 90 days.

(21) Appl. No.: 18/755,924

(22) Filed: Jun. 27, 2024

(65) Prior Publication Data

US 2024/0348320 A1    Oct. 17, 2024

Related U.S. Application Data

(63) Continuation of application No. 17/438,202, filed as application No. PCT/CN2020/090498 on May 15, 2020, now Pat. No. 12,052,085.

(51) Int. Cl.
*H04B 7/06* (2006.01)
*H04B 7/08* (2006.01)
(Continued)

(52) U.S. Cl.
CPC ......... *H04B 7/06964* (2023.05); *H04B 7/088* (2013.01); *H04L 1/203* (2013.01);
(Continued)

(58) Field of Classification Search
None
See application file for complete search history.

(56) References Cited

U.S. PATENT DOCUMENTS

| 10,893,431 B2 | 1/2021 | Liou et al. |
| 2019/0313390 A1 | 10/2019 | Cheng |

(Continued)

FOREIGN PATENT DOCUMENTS

| CN | 110062397 A | 7/2019 |
| CN | 111132204 A | 5/2020 |

(Continued)

OTHER PUBLICATIONS

U.S. Appl. No. 17/438,202, Notice of Allowance, Apr. 16, 2024, 7 pages.

(Continued)

*Primary Examiner* — Anh Ngoc M Nguyen
(74) *Attorney, Agent, or Firm* — Dorsey & Whitney LLP

(57) ABSTRACT

Beam failure recovery (BFR) in a multiple Downlink Control Information (mDCI) mode may include receiving, by a user equipment (UE), a Downlink Reference Signal (DL RS) set from a next generation Node B (gNB). The DL RS set may be associated with a link between the UE and the gNB and indicate beam failure detection (BFD) is to be performed for the link. The BFR may further include performing, by the UE, a beam failure detection (BFD) for the link using the DL RS set, and performing, by the UE, a candidate beam detection (CBD) for the link, the CBD determining a candidate beam for the link by determining a beam having a reference signal receiving power (RSRP) that is larger than an RSRP threshold. The BFR may further include transmitting, by the UE, a beam failure recovery request (BFRQ) indicating the link to the gNB.

20 Claims, 8 Drawing Sheets

(51) Int. Cl.
*H04L 1/20* (2006.01)
*H04W 72/02* (2009.01)
*H04W 72/044* (2023.01)
*H04W 72/23* (2023.01)
*H04W 74/0833* (2024.01)
*H04W 76/19* (2018.01)

(52) U.S. Cl.
CPC ......... *H04W 72/02* (2013.01); *H04W 72/044* (2013.01); *H04W 72/23* (2023.01); *H04W 74/0841* (2013.01); *H04W 76/19* (2018.02)

(56) References Cited

U.S. PATENT DOCUMENTS

| | | |
|---|---|---|
| 2019/0379506 A1 | 12/2019 | Cheng |
| 2020/0280483 A1 | 9/2020 | Zhang et al. |
| 2021/0351834 A1* | 11/2021 | Yang .................. H04W 72/046 |
| 2022/0337473 A1 | 10/2022 | Lin |
| 2023/0058492 A1* | 2/2023 | Wang ................ H04W 74/0808 |

FOREIGN PATENT DOCUMENTS

| | | |
|---|---|---|
| EP | 3509373 A1 | 7/2019 |
| WO | 2020070238 A1 | 4/2020 |

OTHER PUBLICATIONS

U.S. Appl. No. 17/438,202, Non-Final Office Action, Nov. 9, 2023, 14 pages.

Apple Inc., "On Further MIMO Enhancement", R1-2002342, 3GPP TSG RAN WG1 #100b, e-Meeting, Agenda Item 7.2.6.6, Apr. 20-30, 2020, 8 pages.

LG Electronics, "Enhancements on multi-TRP/panel transmission", R1-1912269, 3GPP TSG RAN WG1 Meeting #99, Reno, Nevada, USA, Agenda Item 7.2.8.2, Nov. 18-22, 2019, 16 pages.

Moderator (AT&T), "Summary on UE features for eMIMO", R1-2001868, 3GPP TSG RAN WG1 #100bis, e-Meeting, Agenda Item 7.2.11.6, Apr. 20-30, 2020, 62 pages.

PCT/CN2020/090498, International Search Report and Written Opinion, Feb. 18, 2021, 9 pages.

* cited by examiner

SYSTEMS AND METHODS FOR BEAM FAILURE RECOVERY FOR MULTI-DCI MODE

TECHNICAL FIELD

This application relates generally to wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
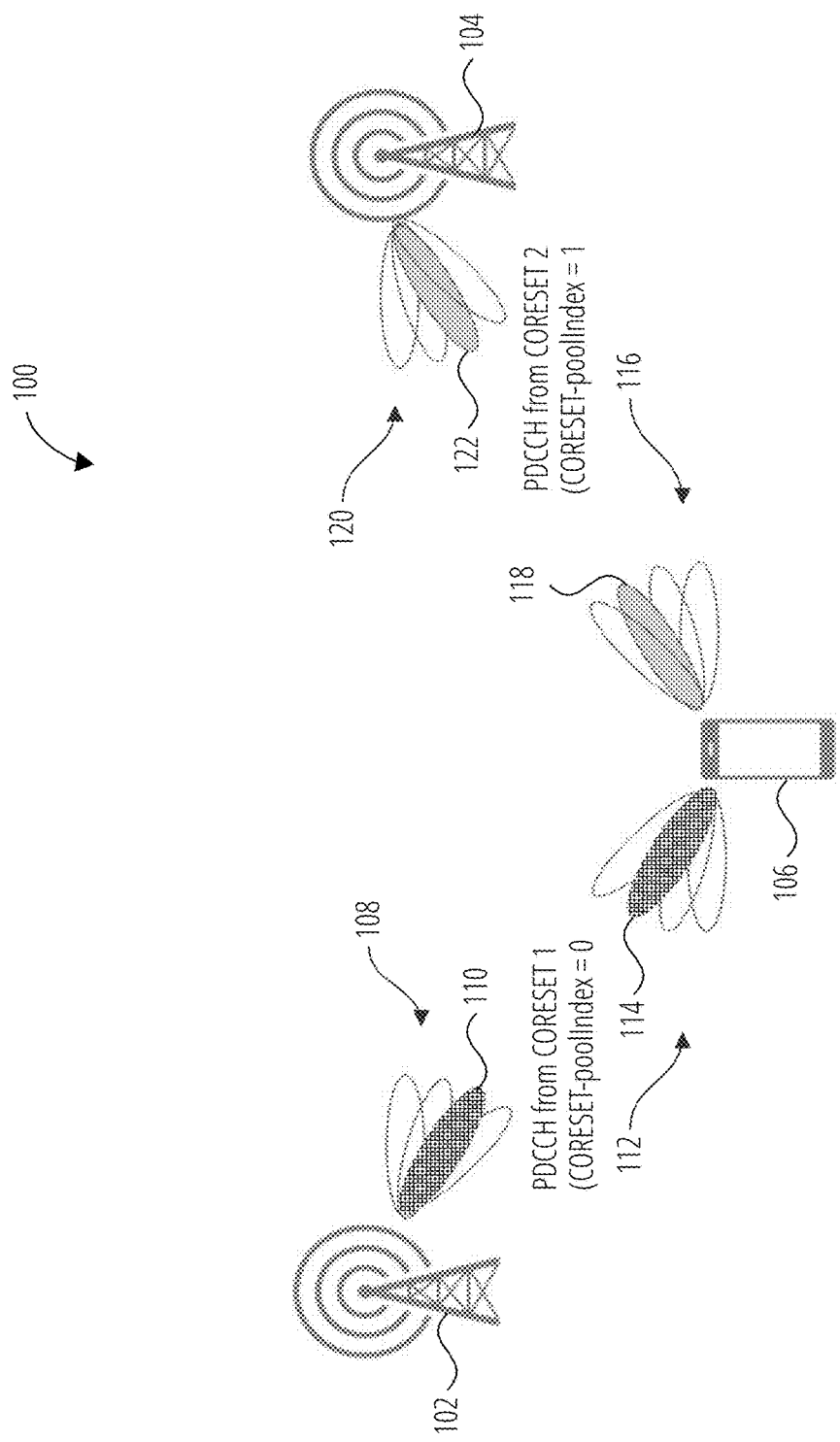
FIG. 1 illustrates a system in accordance with some embodiments.

In 3GPP Rel-16, operation using multiple Downlink Control Information (mDCI) mode based multiple transmission and reception points (multi-TRP) has been supported. Here, a UE can receive signals from multiple TRPs simultaneously, which are scheduled by multiple Physical Downlink Control Channels (PDCCHs). PDCCHs from different TRPs can be transmitted from different Control Resource Sets (CORESETs) with different CORESET-poolIndex values. The network may be deployed with an ideal-backhaul or non-ideal-backhaul.

In 3GPP Rel-15/Rel-16, the beam failure recovery (BFR) operation has been supported. A UE can report to a next generation NodeB (gNB) that the beams for all the CORESETs in a serving cell failed, and further report a new candidate beam to the gNB. The UE can determine a hypothetical block error ratio (BLER) for a downlink reference signal, e.g. a Channel State Information Reference Signal (CSI-RS), which is quasi-co-located (QCLed) with a CORESET to determine whether the beam for the CORESET fails or not. If the detected BLER is larger than a threshold, the UE can determine a beam failure instance for a CORESET. After detecting X number of consecutive beam failure instances for all CORESETs, the UE can declare beam failure. The new candidate beam can be the beam having a reference signal receiving power (RSRP) that is larger than a threshold.

For mDCI mode, gNB(s) can be deployed in non-ideal-backhaul mode. However, 3GPP Rel-15/Rel-16 behavior may not recover beam failure between one gNB to a UE. This is because the UE reports beam failure and a potential new candidate beam only after beam failure happens for all CORESETs. Thus, determining how to perform beam failure recovery (BFR) between a gNB and UE may be an issue. More specifically, issues may include how to detect the beam failure between a gNB and UE, how to detect the new candidate beam (e.g., candidate beam detection, CBD) between a gNB and UE, and how to report the beam failure event (beam failure recovery request, BFRQ) when beam failure is declared. Some embodiments of the present disclosure may address one or more of such issues.

Solution—Procedure

In some embodiments, a beam failure recovery (BFR) procedure may be performed per link. Each link may be a link between a gNB and a UE. In some embodiments, the UE performs beam failure detection (BFD) and CBD simultaneously. In other embodiments, the UE performs BFD first and after it declares beam failure, the UE performs CBD.

Solution—Beam Failure Detection

In some embodiments, in multi-DCI mode, a UE can detect BFD based on N number, e.g. N=2, sets of downlink reference signals (DL RSs). In some embodiments, each set of DL RS may correspond to CORESETs with the same CORESET-poolIndex. In some embodiments, the DL RS could be a CSI-RS and/or a synchronization signal block (SSB). In some embodiments, the DL RS can be configured by radio resource control (RRC) signaling. In some embodiments, if the DL RS is not configured (e.g., not configured by RRC signaling), the DL RS configured for a transmission configuration indicator (TCI) state for a CORESET could be used for beam failure detection. Here, for example, if there are two DL RS configured in a TCI state, the one configured with QCL-typeD (e.g., spatial receiver (Rx) parameters) can be used. In some embodiments, the DLRS can be QCLed with a CORESET. In some embodiments, the BLER threshold and other BFD related parameters, e.g. BFD counter/timer, could be the same or different for each set.

Solution—Candidate Beam Detection

In some embodiments, in multi-DCI mode, a UE can be configured with N number, e.g. N=2, sets of downlink reference signals for candidate beam detection. In some embodiments, each set of DL RS may correspond to BFR for CORESETs with the same CORESET-poolIndex. In some embodiments, the DL RS could be CSI-RS and/or SSB. In some embodiments, the DL RS can be configured by RRC signaling. Here, for example, the gNB may configure at least one DL RS for a set. In some embodiments, if a DL RS is not configured for a set, a default DL RS set can be used, e.g. the SSB from initial bandwidth part. In some embodiments, the N sets of DL RS for candidate beam detection may be orthogonal. In some embodiments, the RSRP threshold could be the same or different for each sets.

Solution—Beam Failure Recovery Request

In some embodiments, after a UE declares that beam failure happens for a set of DL RS for BFD, the UE can report a beam failure recovery request (BFRQ) e.g., to a gNB. In some embodiments, the BFRQ can be reported by a medium access control (MAC) control element (CE) (Option 1). In some embodiments, the BFRQ can be reported by a physical random access channel (PRACH) (Option 2). In some embodiments, the BFRQ can be reported by physical uplink control channel (PUCCH) (Option 3). In some embodiments, for each option, after K number (e.g., K=28) of symbols after the UE receives a response from the gNB, the UE can apply the new beam to all the CORESETs corresponding to the failed CORESET-poolIndex or the UE can apply the new beam to all the PUCCH resources corresponding to the failed CORESET-poolIndex if no BFRQ related signal is transmitted from the PUCCH resource.

Solution—Option 1

In some embodiments, the MAC CE can carry the BFRQ and can include one of, a subset of, or all of the following information: failed serving cell index; failed CORESET-poolIndex or DL RS set index for BFD; a flag to indicate whether a new beam is detected; a new beam index selected from corresponding DL RS set for CBD. In some embodiments, one MAC CE can be used to indicate beam failure for one or multiple serving cells. In another example, one MAC CE can be used to indicate beam failure for one or multiple CORESET-poolIndex in one serving cell. In another example, one MAC CE can be used to indicate beam failure for one CORESET-poolIndex in one serving cell. In some embodiments, regarding the priority of MAC CE multiplexing, the priority of the MAC CE could be the same as the priority of MAC CE for BFR in 3GPP Rel-16. In another example, the priority of the MAC CE could be lower or higher than MAC CE for BFR in 3GPP Rel-16. In some embodiments, the MAC CE may be triggered by a dedicated scheduling request which may be configured by higher layer signaling. In some embodiments, a response for the MAC CE could be a DCI to schedule a new transmission with the same hybrid automatic repeat request (HARQ) process ID as the physical uplink shared channel (PUSCH) used to carry the MAC CE.

Solution—Option 2

In some embodiments, a UE can be configured with multiple PRACH resources, with each PRACH resource associated with a DL RS for CBD. In some embodiments, the PRACH resources could be divided into N number of groups. For example, each group can be used for BFRQ for a CORESET-poolIndex. In some embodiments, the response for the PRACH could be a PDCCH transmitted in a dedicated search space (SS) or CORESET. In some embodiments, the dedicated SS or CORESET could be configured by higher layer signaling, e.g. RRC signaling.

Solution—Option 3

In some embodiments, a UE can be configured by single-bit PUCCH resources, where each PUCCH resource is associated with a DL RS for CBD. In some embodiments, the PUCCH resources could be divided into N number of groups. For example, each group could be used for BFRQ for a CORESET-poolIndex.

In some embodiments, a UE can be configured by multi-bit PUCCH resources, where each PUCCH resource is associated with a CORESET-poolIndex. In some embodiments, the PUCCH can be used to carry one of, a subset of, or all of the following information: failed serving cell index; failed CORESET-poolIndex or DL RS set index for BFD; a flag to indicate whether a new beam is detected; a new beam index selected from corresponding DL RS set for CBD. In some embodiments, the response for the PUCCH could be a PDCCH transmitted in a dedicated search space (SS) or CORESET. In some embodiments, the dedicated SS or CORESET could be configured by higher layer signaling, e.g. RRC signaling.

Solution—Control Signaling to Enable Multi-DCI BFR

In some embodiments, the multi-DCI BFR can be enabled by explicit RRC signaling.

In some embodiments, the multi-DCI BFR can be enabled by number of DL RS sets for BFD. In some embodiments, if more than one sets are configured, multi-DCI based BFR can be enabled. In some embodiments, if only one set is configured, 3GPP Rel-15/Rel-16 based BFR can be enabled. In some embodiments, if no set is configured, BFR can be disabled.

In some embodiments, to determine whether a set is configured, the UE can detect whether beamFailureDetectionCounter is configured or not. For example, if beamFailureDetectionCounter is configured, the UE can determine that the set is configured. Otherwise, for example, if beamFailureDetectionCounter is not configured, the UE can determine that the set is not configured.

FIG. 1 shows a system 100 in accordance with some embodiments. In the embodiment shown, system 100 includes a gNB 102, a gNB 104, and a UE 106. UE 106 and one or both of gNB 102 and gNB 104 may communicate with other using signals 108, signals 112, signals 116, and signals 120. For example, gNB 102 and/or gNB 104 are transmission and reception points (TRPs) in system 100, and UE 106 supports multi-TRP operation. In some embodiments, gNB 102 transmits a signal 110 of signals 108 to UE 106 and UE 106 transmits a signal 114 of signals 112 to gNB 102. In some embodiments, gNB 104 transmits a signal 122 of signals 120 to UE 106 and UE 106 transmits a signal 118 of signals 116 to gNB 104.

In 3GPP Rel-16, multiple Downlink Control Information (mDCI) mode based multiple transmission and reception points (multi-TRP) operation has been supported. For example, UE 106 receives signals (e.g., signal 110 and signal 122 from multiple TRPs (e.g., gNB 102 and gNB 104) simultaneously, where the signal 110 and signal 122 are scheduled by multiple Physical Downlink Control channels (PDCCHs). PDCCHs from different TRPs (e.g., gNB 102, gNB 104) can be transmitted from different Control Resource Sets (CORESETs) for each of the TRPs having different CORESET-poolIndex values. In some embodiments, signal 110 and/or signal 114 for communication between UE 106 and gNB 102 use a PDCCH from CORESET 1 having a CORESET-poolIndex value of zero. In some embodiments, signal 118 and/or signal 122 for communication between UE 106 and gNB 104 use a PDCCH from CORESET 2 having a CORESET-poolIndex value of one. In some embodiments, the network of system 100 (e.g., gNB 102 and gNB 104) having an mDCI mode may be deployed with an ideal-backhaul or non-ideal-backhaul. For example, a system with ideal-backhaul may have a latency less than at or about 2.5 microseconds and a throughput of up to at or about 10 Gbps. A system with non-ideal-backhaul may have a latency and throughout outside the ranges provided for ideal-backhaul.

In 3GPP Rel-15/Rel-16, beam failure recovery (BFR) operation has been supported. A UE (e.g., UE 106) may report the beams (or signals) for all the CORESETs in a serving cell failed, and report a new candidate beam to a next generation NodeB (gNB). UE 106 determines a hypothetical block error ratio (BLER) for a downlink reference signal, (e.g. Channel State Information Reference Signal (CSI-RS)), which is quasi-co-located (QCLed) with a CORESET to determine whether the beam for the CORESET fails or not. If the detected BLER is larger than a threshold, UE 106 can consider beam failure instance for a CORESET. After detecting X number of consecutive beam failure instances for all CORESETs, UE 106 can declare beam failure. The new candidate beam can be the beam having a reference signal receiving power (RSRP) that is larger than a threshold.

In some embodiments, BFR operation is performed using an alternative method. Here, determining that beams for all CORESETs in a serving cell failed is not required. Instead, a beam failure instance can be determined by a UE (e.g., UE 106) by determining that a beam for only a single CORESET for a gNB (e.g., gNB 102, gNB 104) failed. Such BFR operation may allow improved link recovery that would otherwise be blocked if determining all beams for all CORESETs in a serving cell failed were required.

Figure 2:
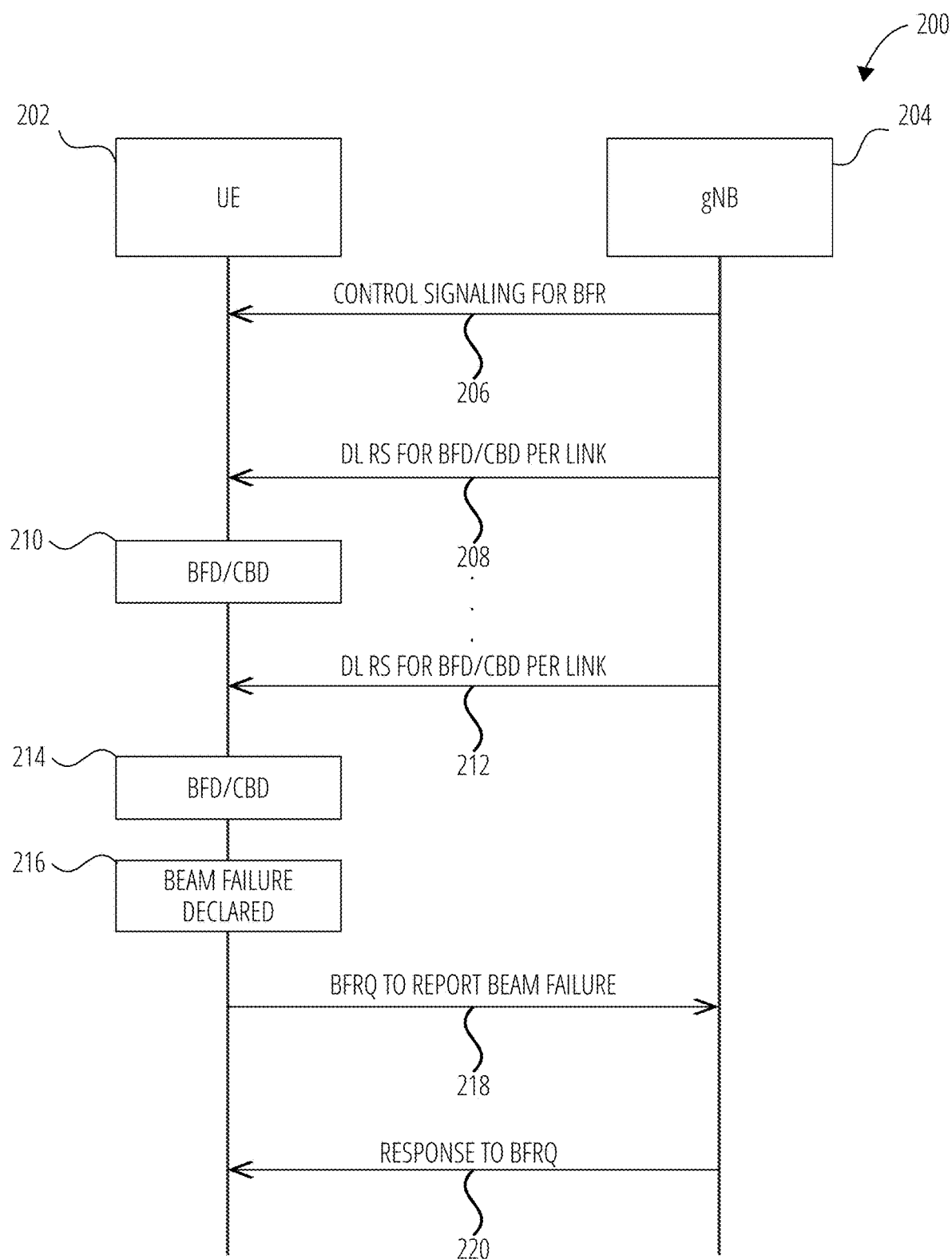
FIG. 2 illustrates a process in accordance with some embodiments.

FIG. 2 shows a beam failure recovery (BFR) process 200 in accordance with some embodiments. In the embodiment shown, BFR process 200 is performed on a per link basis between a UE 202 (e.g., UE 106 in FIG. 1) and a gNB 204 (e.g., gNB 102, gNB 104 in FIG. 1). It should be noted that the order of items shown in process 200 may be different to that shown in FIG. 2 and item(s) may be combined and/or removed where suitable.

At item 206, UE 202 receives control signaling for BFR from gNB 204. In some embodiments, the control signaling is control signaling to enable multi-DCI BFR. In some embodiments, the control signaling can be explicit RRC signaling that enables multi-DCI BFR (e.g., link specific BFD and/or CBD is enabled). In some embodiments, the control signaling can be signaling by a number of downlink reference signals (DL RS) sets for BFD (or, e.g., CBD) that enable multi-DCI BFR. Here, if more than one (e.g., two or more) DL RS sets are configured by gNB 204 for BFD, UE 202 determines that multi-DCI based BFR (e.g., including BFD and/or CBD) is enabled per link (e.g., per link associated with each DL RS set). If only one set is configured, UE 202 determines that 3GPP Rel-15/Rel-16 based BFR is enabled. If no set is configured, UE 202 determines that BFR is disabled. In some embodiments, to determine whether a set (e.g., DL RS set) is configured, UE 202 detects whether beamFailureDetectionCounter is configured or not. For example, if beamFailureDetectionCounter is configured, UE 202 determines that the set (e.g., DL RS set) is configured. Otherwise, for example, if beamFailureDetectionCounter is not configured, UE 202 determines that the set (e.g., DL RS set) is not configured.

If multi-DCI BFR is configured, process 200 continues to item 208. At item 208, UE 202 receives from gNB 204 DL RS for beam failure detection (BFD) and/or candidate beam detection (CBD) for one or more links between UE 202 and gNB 204. In some embodiments, one or more DL RS sets each containing one or more DL RS are received by UE 202 from gNB 204 per link between UE 202 and gNB 204, where each DL RS set corresponds to a link between UE 202 and gNB 204, and each DL RS within each DL RS set is for a particular beam within the link. In some embodiments, the transmission at item 208 is periodically sent by gNB 204 to UE 202 and periodically received by UE 202. Process 200 then continues to item 210, where BFD and/or CBD is performed on a per link basis by UE 202 depending on the DL RS of the link. Thus, one or multiple instances of BFD and/or CBD may be performed at item 210 depending on the number of link(s) that are present.

In some embodiments, the DL RS of item 208 is for BFD. In some embodiments, in multi-DCI mode, UE 202 detects BFD based on N number (e.g. N=2) of sets of DL RSs. UE 202 determines, for example, that N sets of DL RS have been configured (e.g., by gNB 204) for BFD and therefore indicate BFD is to be performed. In some embodiments, each set of DL RS may correspond to one or more CORESETs with the same CORESET-poolIndex. In some embodiments, a DL RS (e.g., of the DL RS set) could be a CSI-RS and/or a synchronization signal block (SSB) that indicates BFD is to be performed for a link. In some embodiments, a DL RS can be configured by radio resource control (RRC) signaling (e.g., by gNB 204). In some embodiments, if a DL RS is not configured (e.g., not configured by RRC signaling or configured as a CSI-RS or SSB), a DL RS configured for a transmission configuration indicator (TCI) state for a CORESET (e.g., for each CORESET having the same CORESET-poolIndex) could be used for beam failure detection. Here, for example, if there are two DL RS configured in a TCI state, the one configured with QCL-typeD (e.g., spatial receiver (Rx) parameters) can be used. In some embodiments, the DLRS can be QCLed with a CORESET. In some embodiments, the BLER threshold and other BFD related parameters, e.g. BFD counter/timer, could be the same or different for each set. In item 210, BFD is performed for UE 202 since the DL RS of the link is for BFD. UE 202 can determine a BLER for a DL RS, which may be quasi-co-located (QCLed) with a CORESET, to determine whether the beam for the CORESET of a particular link fails or not. If the detected BLER is larger than a threshold, UE 202 can determine beam failure instance for a CORESET for the link.

Figure 3:
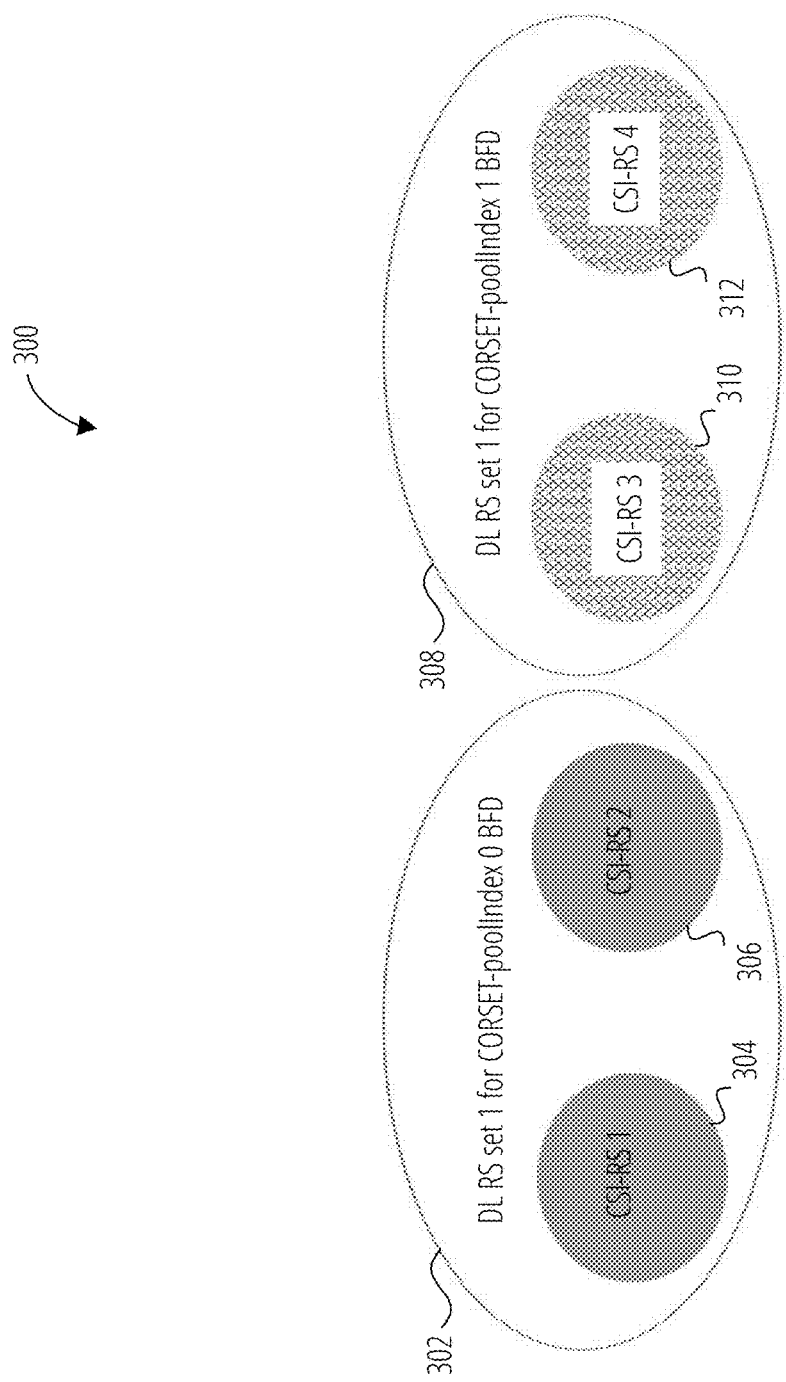
FIG. 3 illustrates a diagram in accordance with some embodiments.

FIG. 3 shows an exemplary diagram 300 illustrating the relation between DL RS and CORSET-poolIndex for BFD according to some embodiments. DL RS set 302 corresponds to CORESETS having a CORESET-poolIndex equal to zero for BFD, where DL RS set 302 includes a DL RS in a CSI-RS 304 and a DL RS in a CSI-RS 306. DL RS set 308 corresponds to CORESETS having a CORESET-poolIndex equal to one for BFD, where DL RS set 308 includes a DL RS in a CSI-RS 310 and a DL RS in a CSI-RS 312.

Back to FIG. 2, in some embodiments, DL RS of item 208 is for CBD. Here, in multi-DCI mode, UE 202 is configured with N number, e.g. N=2, sets of DL RS for CBD. UE 202 is thereby configured for CBD. In some embodiments, each set of DL RS is configured for CBD (e.g., by gNB 204). In some embodiments, each set of DL RS may correspond to one or more CORESETs with the same CORESET-poolIndex, for BFR. In some embodiments, a DL RS (e.g., of the DL RS set) could be a CSI-RS and/or SSB indicating CBD is to be performed for the link. In some embodiments, the DL RS can be configured by RRC signaling. Here, for example, the gNB may configure at least one DL RS for a set. In some embodiments, if UE 202 determines that a DL RS is not configured for a set (or that a DL RS set is not configured), a default DL RS or DL RS set can be used which, for example, may indicate CBD is to be performed for a link. The default DL RS or DL RS set can be, for example, an SSB from an initial bandwidth part (e.g., initial bandwidth used by UE 202 to access gNB 204) or SSB from the current bandwidth part (e.g., current bandwidth used by UE 202 to access gNB 204). In some embodiments, the N sets of DL RS for CBD may be orthogonal. In some embodiments, the RSRP threshold are the same or different for each sets. In item 210, is CBD is performed by UE 202 since the DL RS of the link is for CBD and UE 202 is configured for CBD. The new candidate beam determined by CBD can be a beam having a reference signal receiving power (RSRP) that is larger than the RSRP threshold.

Figure 4:
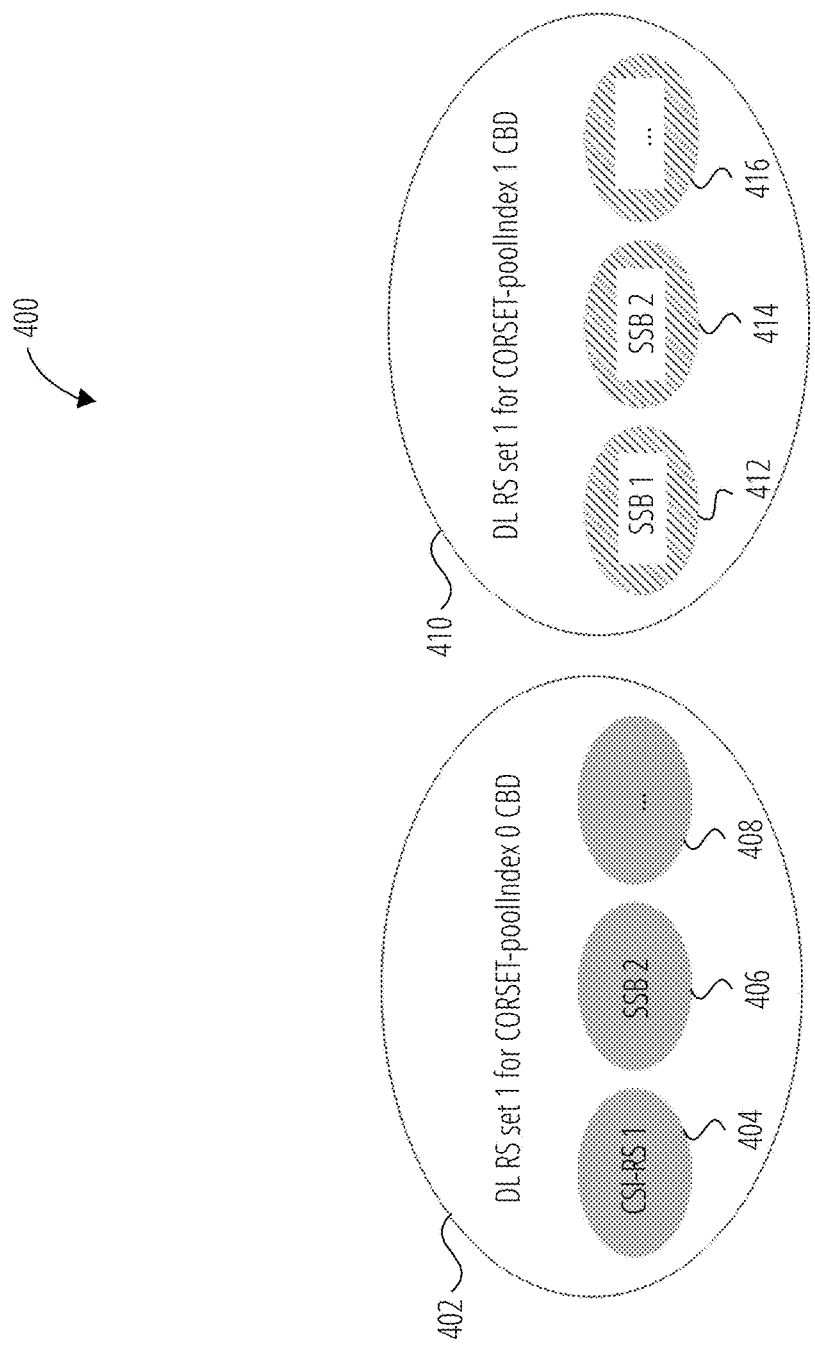
FIG. 4 illustrates a diagram in accordance with some embodiments.

FIG. 4 shows an exemplary diagram 400 illustrating the relation between DLRS and CORSET-poolIndex for CBD according to some embodiments. DL RS set 402 corresponds to CORESETS having a CORESET-poolIndex equal to zero for CBD, where DL RS set 402 includes a DL RS in a CSI-RS 404, a DL RS set in an SSB 406, and a DL RS in other format(s) 408. DL RS set 410 corresponds to CORESETS having a CORESET-poolIndex equal to one for CBD, where DL RS set 410 includes a DL RS in an SSB 412, a DL RS in an SSB 414, and a DL RS in other format(s) 416.

Back to FIG. 2, at item 212, UE 202 receives from gNB 204 DL RS (e.g., DL RS set; e.g., on a per link basis). In some embodiments, the DL RS set is for BFD. In some embodiments, the DL RS set is for CBD. In some embodiments, the DL RS set is for the other of BFD or CBD for each link which was not received at item 208, by UE 202. In some embodiments, the transmission at item 212 is periodically sent by gNB 204 to UE 202 and periodically received by UE 202. Description regarding item 212 is the same or substantially the same as the description for item 208 and is therefore not repeated for brevity. At item 214, BFD or CBD, depending on the DL RS transmitted at item 212, is performed by UE 202 on a per link basis. Thus, one or multiple instances of BFD and/or CBD may be performed at item 210 depending on the number of link(s) that are present. For each link, if the DL RS of item 212 is for BFD, then BFD is performed by UE 202 at item 214, and if the DL RS of item 212 is for CBD, then CBD is performed by UE 202 at item 214.

It should be noted that in some embodiments, UE 202 performs BFD and CBD simultaneously for one or more links at item 210 and/or item 214 where item 208 and/or item 212 for the one or more links includes DL RS for BFD and CBD.

In some embodiments, UE 202 performs BFD and CBD sequentially. In some embodiments, BFD at item 210, where item 208 includes DL RS for BFD. Process 200 then continues to item 216 to declare beam failure (if such failure is determined). Process 200 thereafter continues to perform CBD, receiving DL RS for CBD after item 216 or at some other time before performing CBD.

At item 216, beam failure is declared using the detection of beam failure at item 210 or item 216.

At item 218, UE 202 transmits signaling to gNB 204. In some embodiments, after UE 202 declares that beam failure occurs for a set of DL RS for BFD, UE 202 reports a beam failure recovery request (BFRQ) in the signaling to gNB 204.

In some embodiments, the BFRQ is reported by UE 202 by a medium access control (MAC) control element (CE) (Option 1). Here, the MAC CE carries the BFRQ and can include one of, a subset of, or all of the following information: failed serving cell index; failed CORESET-poolIndex or DL RS set index for BFD; a flag to indicate whether a new beam is detected; a new beam index selected from corresponding DL RS set for CBD. In some embodiments, one MAC CE can be used to indicate beam failure for one or multiple serving cells. In some embodiments, one MAC CE can be used to indicate beam failure for one or multiple CORESET-poolIndex in one serving cell. In some embodiments, one MAC CE can be used to indicate beam failure for 1 CORESET-poolIndex in one serving cell.

Regarding the priority of MAC CE multiplexing, in some embodiments the priority of the MAC CE is the same as the priority of MAC CE for BFR in 3GPP Rel-16. In some embodiments, the priority of the MAC CE is lower or higher than MAC CE for BFR in 3GPP Rel-16. In some embodiments, the MAC CE is triggered by a dedicated scheduling request which is configured by higher layer signaling. In some embodiments, the response for the MAC CE could be a DCI to schedule a new transmission with the same hybrid automatic repeat request (HARQ) process ID as the physical uplink shared channel (PUSCH) used to carry the MAC CE.

In some embodiments, the BFRQ is reported by UE 202 by a physical random access channel (PRACH) (Option 2). For example, UE 202 can be configured with multiple PRACH resources, with each PRACH resource associated with a DL RS for CBD. In some embodiments, the PRACH resources could be divided into N number of groups. For example, each group can be used for BFRQ for a CORESET-poolIndex. In some embodiments, a PRACH resource may belong to a group of PRACH resources for the same CORESET-poolIndex. In some embodiments, the response for the PRACH could be a PDCCH transmitted in a dedicated search space (SS) or CORESET. In some embodiments, the dedicated SS or CORESET could be configured by higher layer signaling, e.g. RRC signaling.

In some embodiments, the BFRQ is reported by UE 202 by physical uplink control channel (PUCCH) (Option 3). For example, UE 202 can be configured by single-bit PUCCH resources, where each PUCCH resource is associated with a DL RS for CBD. In some embodiments, the PUCCH resources could be divided into N number of groups. For example, each group could be used for BFRQ for a CORESET-poolIndex.

In some embodiments, UE 202 can be configured by multi-bit PUCCH resources, where each PUCCH resource is associated with a CORESET-poolIndex (e.g., the same index for the same set). In some embodiments, the PUCCH can be used to carry one of, a subset of, or all of the following information: failed serving cell index; failed CORESET-poolIndex or DL RS set index for BFD; a flag to indicate whether a new beam is detected; a new beam index selected from corresponding DL RS set for CBD. In some embodiments, the response for the PUCCH could be a PDCCH transmitted in a dedicated search space (SS) or CORESET. In some embodiments, the dedicated SS or CORESET could be configured by higher layer signaling, e.g. RRC signaling.

At item 220, UE 202 receives a response to the reported BFRQ of item 218 from gNB 204. In some embodiments, the response is an acknowledgement from gNB 204 (e.g., "ACK") regarding the BFRQ. In some embodiments, for each of options 1, 2, and 3, after K number (e.g., K=28) of symbols after UE 202 receives the response at item 220 from gNB 204, UE 202 can apply the new beam to all the CORESETs corresponding to the failed CORESET-poolIndex or UE 202 can apply the new beam to all the PUCCH resources corresponding to the failed CORESET-poolIndex if no BFRQ related signal is transmitted from the PUCCH resource.

Figure 5:
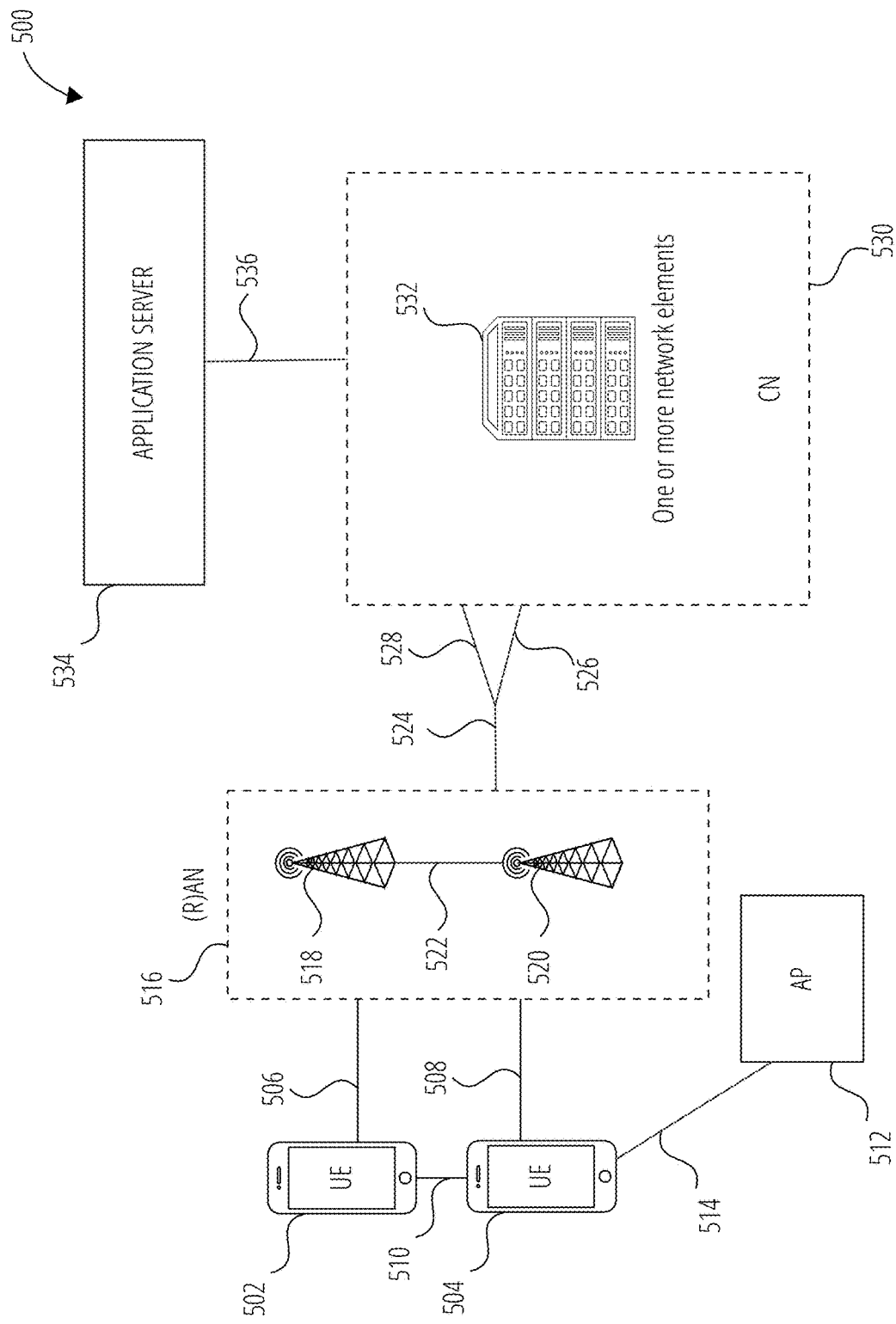
FIG. 5 illustrates a system in accordance with some embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 502 and UE 504. In this example, the UE 502 and the UE 504 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 502 and/or the UE 504 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and UE 504 may be configured to connect, for example, communicatively couple, with an access node or radio access node (shown as (R)AN 516). In embodiments, the (R)AN 516 may be an NG RAN or a SG RAN, an E-UTRAN, or a legacy RAN, such as a UTRAN or GERAN. As used herein, the term "NG RAN" or the like may refer to a (R)AN 516 that operates in an NR or SG system, and the term "E-UTRAN" or the like may refer to a (R)AN 516 that operates in an LTE or 4G system. The UE 502 and UE 504 utilize connections (or channels) (shown as connection 506 and connection 508, respectively), each of which comprises a physical communications interface or layer (discussed in further detail below).

In this example, the connection 506 and connection 508 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 502 and UE 504 may directly exchange communication data via a ProSe interface 510. The ProSe interface 510 may alternatively be referred to as a sidelink (SL) interface and may comprise one or more logical channels, including but not limited to a PSCCH, a PSSCH, a PSDCH, and a PSBCH.

The UE 504 is shown to be configured to access an AP 512 (also referred to as "WLAN node," "WLAN," "WLAN Termination," "WT" or the like) via connection 514. The connection 514 can comprise a local wireless connection, such as a connection consistent with any IEEE 802.11 protocol, wherein the AP 512 would comprise a wireless fidelity (Wi-Fi®) router. In this example, the AP 512 may be connected to the Internet without connecting to the core network of the wireless system (described in further detail below). In various embodiments, the UE 504, (R)AN 516, and AP 512 may be configured to utilize LWA operation and/or LWIP operation. The LWA operation may involve the UE 504 in RRC_CONNECTED being configured by the RAN node 518 or the RAN node 520 to utilize radio resources of LTE and WLAN. LWIP operation may involve the UE 504 using WLAN radio resources (e.g., connection 514) via IPsec protocol tunneling to authenticate and encrypt packets (e.g., IP packets) sent over the connection 514. IPsec tunneling may include encapsulating the entirety of original IP packets and adding a new packet header, thereby protecting the original header of the IP packets.

The (R)AN 516 can include one or more AN nodes, such as RAN node 518 and RAN node 520, that enable the connection 506 and connection 508. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 500 (e.g., an eNB). According to various embodiments, the RAN node 518 or RAN node 520 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 518 or RAN node 520 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 518 or RAN node 520); a MAC/PHY split wherein RRC, PDCP, RLC, and MAC layers are operated by the CRAN/vBBUP and the PHY layer is operated by individual RAN nodes (e.g., RAN node 518 or RAN node 520); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 518 or RAN node 520 to perform other virtualized applications. In some implementations, an individual RAN node may represent individual gNB-DUs that are connected to a gNB-CU via individual F1 interfaces (not shown by FIG. 5). In these implementations, the gNB-DUs may include one or more remote radio heads or RFEMs, and the gNB-CU may be operated by a server that is located in the (R)AN 516 (not shown) or by a server pool in a similar manner as the CRAN/vBBUP. Additionally, or alternatively, one or more of the RAN node 518 or RAN node 520 may be next generation eNBs (ng-eNBs), which are RAN nodes that provide E-UTRA user plane and control plane protocol terminations toward the UE 502 and UE 504, and are connected to an SGC via an NG interface (discussed infra). In V2X scenarios one or more of the RAN node 518 or RAN node 520 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/ software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 518 and/or the RAN node 520 can terminate the air interface protocol and can be the first point of contact for the UE 502 and UE 504. In some embodiments, the RAN node 518 and/or the RAN node 520 can fulfill various logical functions for the (R)AN 516 including, but not limited to, radio network controller (RNC) functions such as radio bearer management, uplink and downlink dynamic radio resource management and data packet scheduling, and mobility management.

In embodiments, the UE 502 and UE 504 can be configured to communicate using OFDM communication signals with each other or with the RAN node 518 and/or the RAN node 520 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 518 and/or the RAN node 520 to the UE 502 and UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 502 and UE 504 and the RAN node 518 and/or the RAN node 520 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 502 and UE 504 and the RAN node 518 or RAN node 520 may operate using LAA, eLAA, and/or feLAA mechanisms. In these implementations, the UE 502 and UE 504 and the RAN node 518 or RAN node 520 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 502 and UE 504, RAN node 518 or RAN node 520, etc.)

senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 502, AP 512, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 502 and UE 504. The PDCCH carries information about the transport format and resource allocations related to the PDSCH channel, among other things. It may also inform the UE 502 and UE 504 about the transport format, resource allocation, and HARQ information related to the uplink shared channel. Typically, downlink scheduling (assigning control and shared channel resource blocks to the UE 504 within a cell) may be performed at any of the RAN node 518 or RAN node 520 based on channel quality information fed back from any of the UE 502 and UE 504. The downlink resource assignment information may be sent on the PDCCH used for (e.g., assigned to) each of the UE 502 and UE 504.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 518 or RAN node 520 may be configured to communicate with one another via interface 522. In embodiments where the system 500 is an LTE system (e.g., when CN 530 is an EPC), the interface 522 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 502 from an SeNB for user data; information of PDCP PDUs that were not delivered to a UE 502; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 530 is an 5GC), the interface 522 may be an Xn interface. The Xn interface is defined between two or more RAN nodes (e.g., two or more gNBs and the like) that connect to SGC, between a RAN node 518 (e.g., a gNB) connecting to SGC and an eNB, and/or between two eNBs connecting to 5GC (e.g., CN 530). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 502 in a connected mode (e.g., CM-CONNECTED) including functionality to manage the UE mobility for connected mode between one or more RAN node 518 or RAN node 520. The mobility support may include context transfer from an old (source) serving RAN node 518 to new (target) serving RAN node 520; and control of user plane tunnels between old (source) serving RAN node 518 to new (target) serving RAN node 520. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 516 is shown to be communicatively coupled to a core network—in this embodiment, CN 530. The CN 530 may comprise one or more network elements 532, which are configured to offer various data and telecommunications services to customers/subscribers (e.g., users of UE 502 and UE 504) who are connected to the CN 530 via the (R)AN 516. The components of the CN 530 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 530 may be referred to as a network slice, and a logical instantiation of a portion of the CN 530 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 534 may be an element offering applications that use IP bearer resources with the core network (e.g., UMTS PS domain, LTE PS data services, etc.). The application server 534 can also be configured to support one or more communication services (e.g., VoIP sessions, PTT sessions, group communication sessions, social networking services, etc.) for the UE 502 and UE 504 via the EPC. The application server 534 may communicate with the CN 530 through an IP communications interface 536.

In embodiments, the CN 530 may be an SGC, and the (R)AN 116 may be connected with the CN 530 via an NG interface 524. In embodiments, the NG interface 524 may be split into two parts, an NG user plane (NG-U) interface 526, which carries traffic data between the RAN node 518 or RAN node 520 and a UPF, and the S1 control plane (NG-C) interface 528, which is a signaling interface between the RAN node 518 or RAN node 520 and AMFs.

In embodiments, the CN 530 may be a 5G CN, while in other embodiments, the CN 530 may be an EPC). Where CN 530 is an EPC, the (R)AN 116 may be connected with the CN 530 via an S1 interface 524. In embodiments, the S1 interface 524 may be split into two parts, an S1 user plane (S1-U) interface 526, which carries traffic data between the RAN node 518 or RAN node 520 and the S-GW, and the S1-MME interface 528, which is a signaling interface between the RAN node 518 or RAN node 520 and MMEs.

Figure 6:
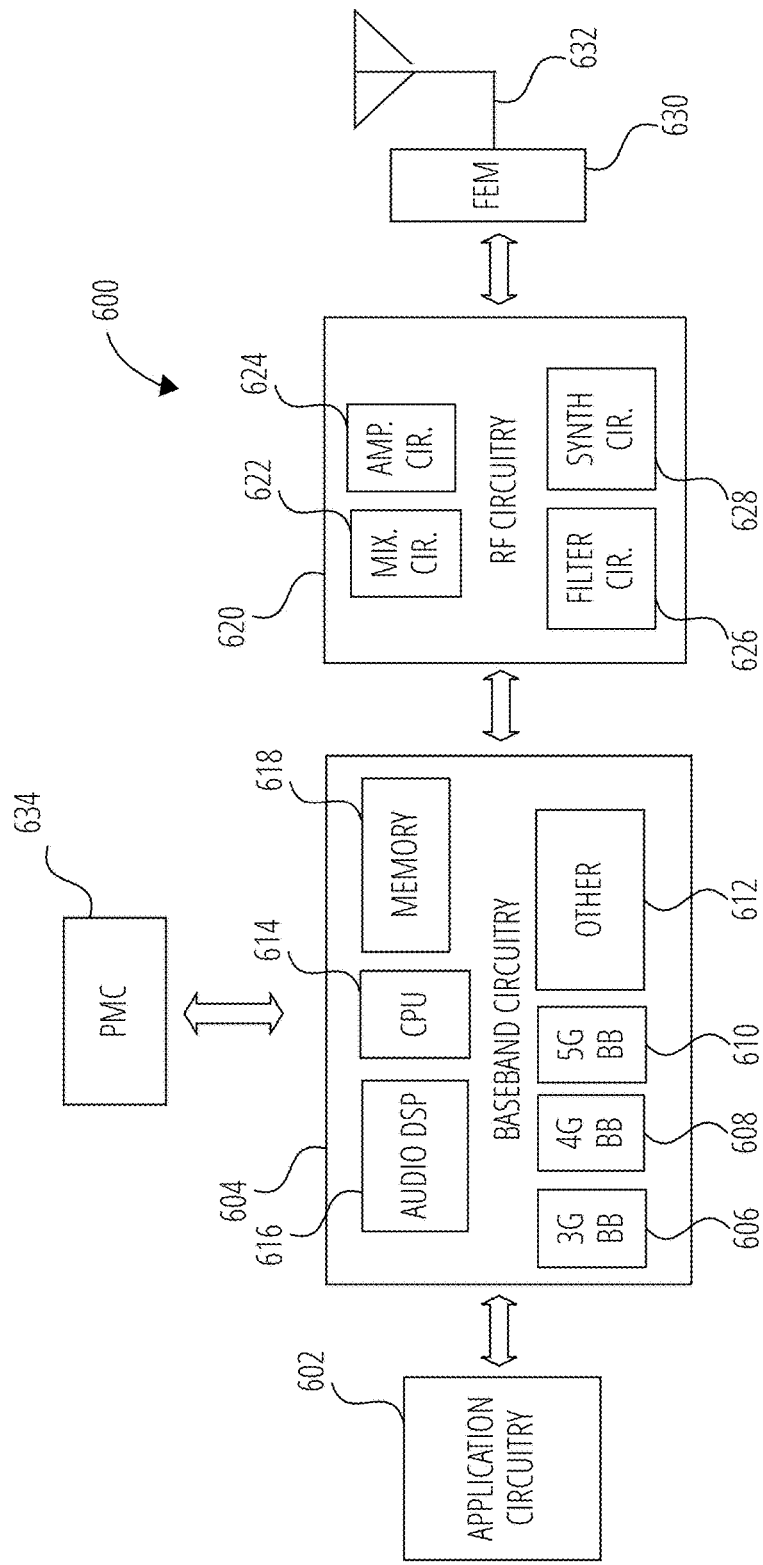
FIG. 6 illustrates a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry (shown as RF circuitry 620), front-end module (FEM) circuitry (shown as FEM circuitry 630), one or more antennas 632, and power management circuitry (PMC) (shown as PMC 634) coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 620 and to generate baseband signals for a transmit signal path of the RF circuitry 620. The baseband circuitry 604 may interface with the application circuitry 602 for generation and processing of the baseband signals and for controlling operations of the RF circuitry 620. For example, in some embodiments, the baseband circuitry 604 may include a third generation (3G) baseband processor (3G baseband processor 606), a fourth generation (4G) baseband processor (4G baseband processor 608), a fifth generation (5G) baseband processor (5G baseband processor 610), or other baseband processor(s) 612 for other existing generations, generations in development or to be developed in the future (e.g., second generation (2G), sixth generation (6G), etc.). The baseband circuitry 604 (e.g., one or more of baseband processors) may handle various radio control functions that enable communication with one or more radio networks via the RF circuitry 620. In other embodiments, some or all of the functionality of the illustrated baseband processors may be included in modules stored in the memory 618 and executed via a Central Processing Unit (CPU 614). The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include a digital signal processor (DSP), such as one or more audio DSP(s) 616. The one or more audio DSP(s) 616 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 604 is configured to support radio communications of more than one wireless protocol may be referred to as multi-mode baseband circuitry.

The RF circuitry 620 may enable communication with wireless networks using modulated electromagnetic radiation through a non-solid medium. In various embodiments, the RF circuitry 620 may include switches, filters, amplifiers, etc. to facilitate the communication with the wireless network. The RF circuitry 620 may include a receive signal path which may include circuitry to down-convert RF signals received from the FEM circuitry 630 and provide baseband signals to the baseband circuitry 604. The RF circuitry 620 may also include a transmit signal path which may include circuitry to up-convert baseband signals provided by the baseband circuitry 604 and provide RF output signals to the FEM circuitry 630 for transmission.

In some embodiments, the receive signal path of the RF circuitry 620 may include mixer circuitry 622, amplifier circuitry 624 and filter circuitry 626. In some embodiments, the transmit signal path of the RF circuitry 620 may include filter circuitry 626 and mixer circuitry 622. The RF circuitry 620 may also include synthesizer circuitry 628 for synthesizing a frequency for use by the mixer circuitry 622 of the receive signal path and the transmit signal path. In some embodiments, the mixer circuitry 622 of the receive signal path may be configured to down-convert RF signals received from the FEM circuitry 630 based on the synthesized frequency provided by synthesizer circuitry 628. The amplifier circuitry 624 may be configured to amplify the down-converted signals and the filter circuitry 626 may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, the mixer circuitry 622 of the receive signal path may comprise passive mixers, although the scope of the embodiments is not limited in this respect.

In some embodiments, the mixer circuitry 622 of the transmit signal path may be configured to up-convert input baseband signals based on the synthesized frequency provided by the synthesizer circuitry 628 to generate RF output signals for the FEM circuitry 630. The baseband signals may be provided by the baseband circuitry 604 and may be filtered by the filter circuitry 626.

In some embodiments, the mixer circuitry 622 of the receive signal path and the mixer circuitry 622 of the transmit signal path may include two or more mixers and may be arranged for quadrature downconversion and upconversion, respectively. In some embodiments, the mixer circuitry 622 of the receive signal path and the mixer circuitry 622 of the transmit signal path may include two or more mixers and may be arranged for image rejection (e.g., Hartley image rejection). In some embodiments, the mixer circuitry 622 of the receive signal path and the mixer circuitry 622 may be arranged for direct downconversion and direct upconversion, respectively. In some embodiments, the mixer circuitry 622 of the receive signal path and the mixer circuitry 622 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 620 may include analog-to-digital converter (ADC) and digital-to-analog converter (DAC) circuitry and the baseband circuitry 604 may include a digital baseband interface to communicate with the RF circuitry 620.

In some dual-mode embodiments, a separate radio IC circuitry may be provided for processing signals for each spectrum, although the scope of the embodiments is not limited in this respect.

In some embodiments, the synthesizer circuitry 628 may be a fractional-N synthesizer or a fractional N/N+1 synthesizer, although the scope of the embodiments is not limited in this respect as other types of frequency synthesizers may be suitable. For example, synthesizer circuitry 628 may be a delta-sigma synthesizer, a frequency multiplier, or a synthesizer comprising a phase-locked loop with a frequency divider.

The synthesizer circuitry 628 may be configured to synthesize an output frequency for use by the mixer circuitry 622 of the RF circuitry 620 based on a frequency input and a divider control input. In some embodiments, the synthesizer circuitry 628 may be a fractional N/N+1 synthesizer.

In some embodiments, frequency input may be provided by a voltage controlled oscillator (VCO), although that is not a requirement. Divider control input may be provided by either the baseband circuitry 604 or the application circuitry 602 (such as an applications processor) depending on the desired output frequency. In some embodiments, a divider control input (e.g., N) may be determined from a look-up table based on a channel indicated by the application circuitry 602.

Synthesizer circuitry 628 of the RF circuitry 620 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 628 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 620 may include an IQ/polar converter.

The FEM circuitry 630 may include a receive signal path which may include circuitry configured to operate on RF signals received from one or more antennas 632, amplify the received signals and provide the amplified versions of the received signals to the RF circuitry 620 for further processing. The FEM circuitry 630 may also include a transmit signal path which may include circuitry configured to amplify signals for transmission provided by the RF circuitry 620 for transmission by one or more of the one or more antennas 632. In various embodiments, the amplification through the transmit or receive signal paths may be done solely in the RF circuitry 620, solely in the FEM circuitry 630, or in both the RF circuitry 620 and the FEM circuitry 630.

In some embodiments, the FEM circuitry 630 may include a TX/RX switch to switch between transmit mode and receive mode operation. The FEM circuitry 630 may include a receive signal path and a transmit signal path. The receive signal path of the FEM circuitry 630 may include an LNA to amplify received RF signals and provide the amplified received RF signals as an output (e.g., to the RF circuitry 620). The transmit signal path of the FEM circuitry 630 may include a power amplifier (PA) to amplify input RF signals (e.g., provided by the RF circuitry 620), and one or more filters to generate RF signals for subsequent transmission (e.g., by one or more of the one or more antennas 632).

In some embodiments, the PMC 634 may manage power provided to the baseband circuitry 604. In particular, the PMC 634 may control power-source selection, voltage scaling, battery charging, or DC-to-DC conversion. The PMC 634 may often be included when the device 600 is capable of being powered by a battery, for example, when the device 600 is included in a UE. The PMC 634 may increase the power conversion efficiency while providing desirable implementation size and heat dissipation characteristics.

FIG. 6 shows the PMC 634 coupled only with the baseband circuitry 604. However, in other embodiments, the PMC 634 may be additionally or alternatively coupled with, and perform similar power management operations for, other components such as, but not limited to, the application circuitry 602, the RF circuitry 620, or the FEM circuitry 630.

In some embodiments, the PMC 634 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
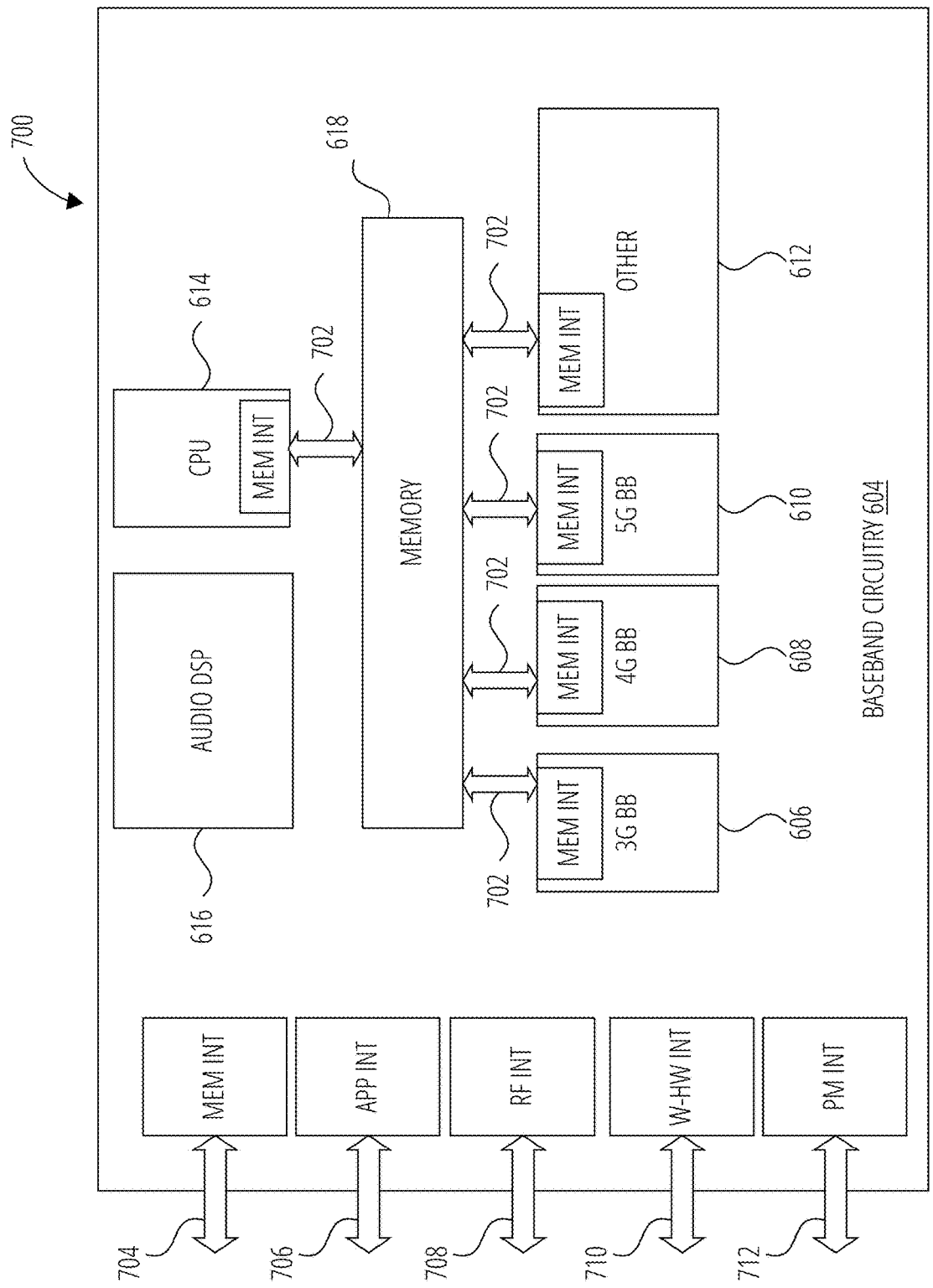
FIG. 7 illustrates example interfaces in accordance with some embodiments.

FIG. 7 illustrates example interfaces 700 of baseband circuitry in accordance with some embodiments. As discussed above, the baseband circuitry 604 of FIG. 6 may comprise 3G baseband processor 606, 4G baseband processor 608, 5G baseband processor 610, other baseband processor(s) 612, CPU 614, and a memory 618 utilized by said processors. As illustrated, each of the processors may include a respective memory interface 702 to send/receive data to/from the memory 618.

The baseband circuitry 604 may further include one or more interfaces to communicatively couple to other circuitries/devices, such as a memory interface 704 (e.g., an interface to send/receive data to/from memory external to the baseband circuitry 604), an application circuitry interface 706 (e.g., an interface to send/receive data to/from the application circuitry 602 of FIG. 6), an RF circuitry interface 708 (e.g., an interface to send/receive data to/from RF circuitry 620 of FIG. 6), a wireless hardware connectivity interface 710 (e.g., an interface to send/receive data to/from Near Field Communication (NFC) components, Bluetooth® components (e.g., Bluetooth® Low Energy), Wi-Fi® components, and other communication components), and a power management interface 712 (e.g., an interface to send/receive power or control signals to/from the PMC 634.

Figure 8:
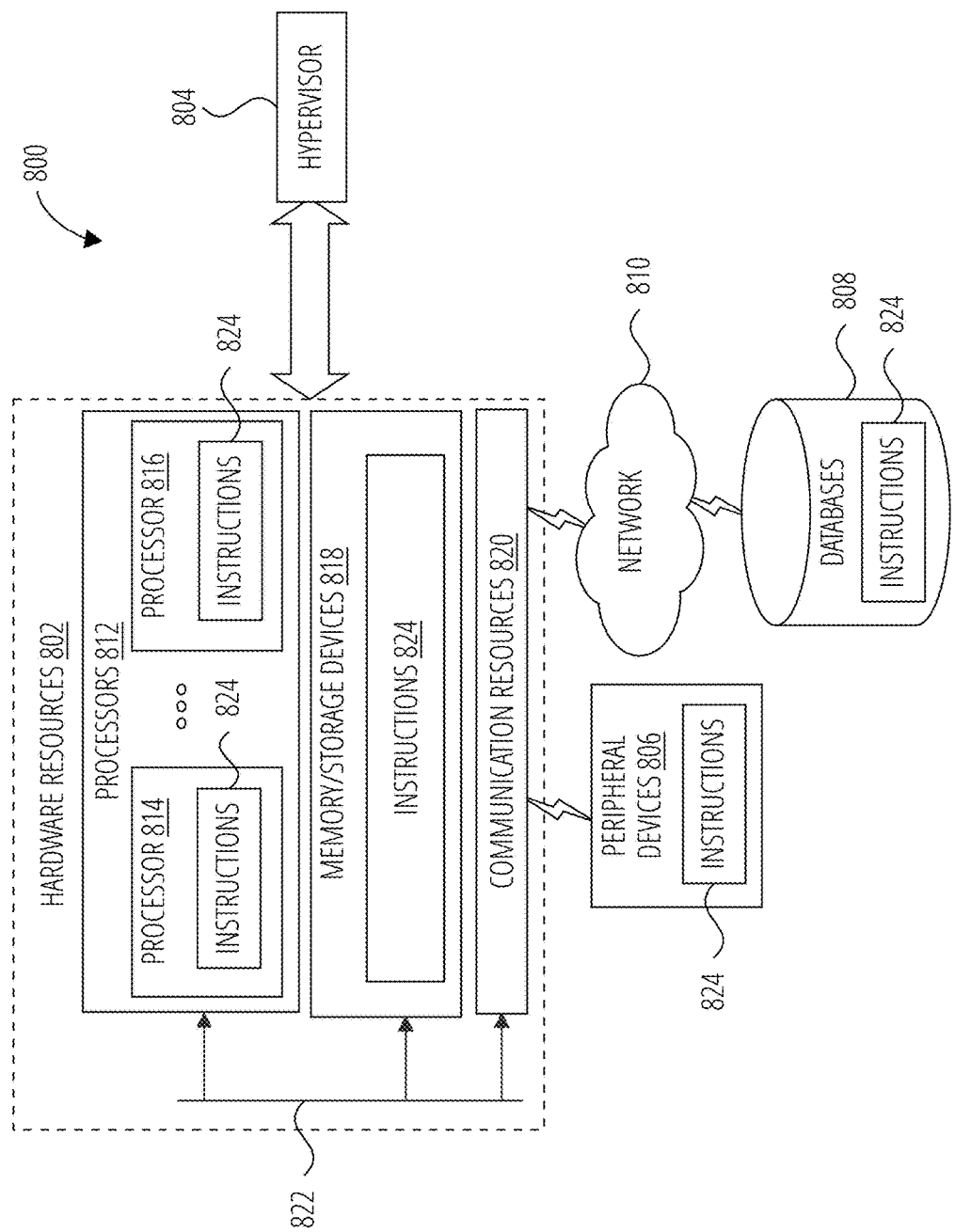
FIG. 8 illustrates components in accordance with some embodiments.

FIG. 8 is a block diagram illustrating components 800, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 802 including one or more processors 812 (or processor cores), one or more memory/storage devices 818, and one or more communication resources 820, each of which may be communicatively coupled via a bus 822. For embodiments where node virtualization (e.g., NFV) is utilized, a hypervisor 804 may be executed to provide an execution environment for one or more network slices/sub-slices to utilize the hardware resources 802.

The processors 812 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 814 and a processor 816.

The memory/storage devices 818 may include main memory, disk storage, or any suitable combination thereof. The memory/storage devices 818 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 820 may include interconnection or network interface components or other suitable devices to communicate with one or more peripheral devices 806 or one or more databases 808 via a network 810. For example, the communication resources 820 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 824 may comprise software, a program, an application, an applet, an app, or other executable code for causing at least any of the processors 812 to perform any one or more of the methodologies discussed herein. The instructions 824 may reside, completely or partially, within at least one of the processors 812 (e.g., within the processor's cache memory), the memory/storage devices 818, or any suitable combination thereof. Furthermore, any portion of the instructions 824 may be transferred to the hardware resources 802 from any combination of the peripheral devices 806 or the databases 808. Accordingly, the memory of the processors 812, the memory/storage devices 818, the peripheral devices 806, and the databases 808 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 includes a non-transitory computer-readable storage medium for a user equipment (UE) to perform beam failure recovery (BFR) in a multiple Downlink Control Information (mDCI) mode. The computer-readable storage medium includes instructions that when executed by a computer, cause the computer to receive, by the UE, a Downlink Reference Signal (DL RS) set from a next generation Node B (gNB), the DL RS set associated with a link between the UE and the gNB and indicating beam failure detection (BFD) is to be performed for the link, the DL RS set received periodically by the UE from the gNB. The instructions further cause the computer to perform, by the UE, a beam failure detection (BFD) for the link using the DL RS set, the BFD determining a beam failure for the link by determining that a block error ratio (BLER) for the link is larger than a BLER threshold. The instructions further control the computer to perform, by the UE, a candidate beam detection (CBD) for the link, the CBD determining a candidate beam for the link by determining a beam having a reference signal receiving power (RSRP) that is larger than an RSRP threshold. The instructions further control the computer to transmit, by the UE, a beam failure recovery request (BFRQ) indicating the link to the gNB.

Example 2 includes the non-transitory computer readable storage medium of example 1, wherein the DL RS set corresponds to one or more CORESETs having a same CORESET-poolIndex value.

Example 3 includes the non-transitory computer readable storage medium of example 1, wherein the DL RS set includes a DL RS that is a Channel State Information Reference Signal (CSI-RS) or a synchronization signal block (SSB) indicating BFD is to be performed for the link.

Example 4 includes the non-transitory computer readable storage medium of example 3, wherein the DL RS is configured by radio resource control (RRC) signaling.

Example 5 includes the non-transitory computer readable storage medium of example 1, wherein the computer-readable storage medium includes instructions that cause the computer to receive, by the UE, an additional DL RS set from the gNB, the additional DL RS set associated with the link and configuring the UE for the CBD, the additional DL RS set received periodically by the UE from the gNB.

Example 6 includes the non-transitory computer readable storage medium of example 5, wherein the additional DL RS set corresponds to one or more CORESETs having the same CORESET-poolIndex.

Example 7 includes the non-transitory computer readable storage medium of example 5, wherein the additional DL RS set includes a DL RS that is a CSI-RS or an SSB indicating CBD is to be performed for the link.

Example 8 includes the non-transitory computer readable storage medium of example 7, wherein the computer-readable storage medium includes instructions that cause the computer to determine, by the UE, that the DL RS of the additional DL RS set is not configured by a gNB and use, by the UE, a default DL RS, wherein the default DL RS is an SSB from an initial bandwidth part or a current bandwidth part and indicates CBD for the link.

Example 9 includes the non-transitory computer readable storage medium of example 1, wherein the BFRQ is transmitted via a Media Access Control Control Element (MAC CE) that includes a failed CORESET-poolIndex or DL RS set index corresponding to the link.

Example 10 includes the non-transitory computer readable storage medium of example 1, wherein the BFRQ is transmitted using a physical random access channel (PRACH), wherein the UE is configured with a PRACH resource associated with a DL RS for the CBD of the link, the PRACH resource belonging to a group of resources for the same CORESET-poolIndex.

Example 11 includes the non-transitory computer readable storage medium of example 1, wherein the BFRQ is transmitted using multi-bit PUCCH resources, wherein each PUCCH resource of the PUCCH resources is associated with the same CORESET-poolIndex, and wherein each PUCCH resource includes a failed CORESET-poolIndex or DL RS set index corresponding to the link.

Example 12 includes the non-transitory computer readable storage medium of example 1, wherein the computer-readable storage medium includes instructions that cause the computer to receive, by the UE, a response regarding the BFRQ from the gNB and apply, by the UE, the candidate beam to one or more CORESETs corresponding to a failed CORESET-poolIndex or DL RS set index corresponding to the link.

Example 13 includes the non-transitory computer readable storage medium of example 1, wherein the BFD and the CBD are performed sequentially.

Example 14 includes the non-transitory computer readable storage medium of example 1, wherein the BFD and the CBD are performed simultaneously.

Example 15 includes the non-transitory computer readable storage medium of example 1, wherein the computer-readable storage medium includes instructions that cause the computer to receive, at the UE, control signaling from the gNB that enables multi-DCI BFR.

Example 16 includes the non-transitory computer readable storage medium of example 15, wherein the control signaling is RRC signaling.

Example 17 includes the non-transitory computer readable storage medium of example 15, wherein the control signaling includes a plurality of DL RS sets configured for BFR and wherein the computer-readable storage medium includes instructions that cause the computer to determine multi-DCI BFR is enabled due to the presence of the plurality of DL RS sets configured for BFR.

Example 18 includes a method for beam failure recovery (BFR) in a multiple Downlink Control Information (mDCI) mode. The method comprises receiving, by a UE, a Downlink Reference Signal (DL RS) set from a next generation Node B (gNB), the DL RS set associated with a link between the UE and the gNB and indicating beam failure detection (BFD) is to be performed for the link, the DL RS set received periodically by the UE from the gNB. The method further comprises performing, by the UE, a beam failure detection (BFD) for the link using the DL RS set, the BFD determining a beam failure for the link by determining that a block error ratio (BLER) for the link is larger than a BLER threshold. The method further comprises performing, by the UE, a candidate beam detection (CBD) for the link, the CBD determining a candidate beam for the link by determining a beam having a reference signal receiving power (RSRP) that is larger than an RSRP threshold. The method further comprises transmitting, by the UE, a beam failure recovery request (BFRQ) indicating the link to the gNB.

Example 19 includes an apparatus for a user equipment (UE) to perform beam failure recovery (BFR) in a multiple Downlink Control Information (mDCI) mode. The apparatus comprises a processor and a memory storing instructions that, when executed by the processor, configure the apparatus to receive, by the UE, a Downlink Reference Signal (DL RS) set from a next generation Node B (gNB), the DL RS set associated with a link between the UE and the gNB and indicating beam failure detection (BFD) is to be performed for the link, the DL RS set received periodically by the UE from the gNB. The instructions further configure the apparatus to perform, by the UE, a beam failure detection (BFD) for the link using the DL RS set, the BFD determining a beam failure for the link by determining that a block error ratio (BLER) for the link is larger than a BLER threshold. The instructions further configure the apparatus to perform, by the UE, a candidate beam detection (CBD) for the link, the CBD determining a candidate beam for the link by determining a beam having a reference signal receiving power (RSRP) that is larger than an RSRP threshold. The instructions further configure the apparatus to transmit, by the UE, a beam failure recovery request (BFRQ) indicating the link to the gNB Example 20 includes the apparatus of example 19, wherein the DL RS set corresponds to one or more CORESETs having a same CORESET-poolIndex value.

Example 21 may include an apparatus comprising means to perform one or more elements of a method described in or related to any of the above Examples, or any other method or process described herein.

Example 22 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 23 may include an apparatus comprising logic, modules, or circuitry to perform one or more elements of a method described in or related to any of the above Examples, or any other method or process described herein.

Example 24 may include a method, technique, or process as described in or related to any of the above Examples, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 26 may include a signal as described in or related to any of the above Examples, or portions or parts thereof.

Example 27 may include a datagram, packet, frame, segment, protocol data unit (PDU), or message as described in or related to any of the above Examples, or portions or parts thereof, or otherwise described in the present disclosure.

Example 28 may include a signal encoded with data as described in or related to any of the above Examples, or portions or parts thereof, or otherwise described in the present disclosure.

Example 29 may include a signal encoded with a datagram, packet, frame, segment, PDU, or message as described in or related to any of the above Examples, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 31 may include a computer program comprising instructions, wherein execution of the program by a processing element is to cause the processing element to carry out the method, techniques, or process as described in or related to any of the above Examples, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a base station performing beam failure recovery (BFR) with a user equipment (UE), the method comprising:
   transmitting, to the UE, control signaling for BFR to enable link specific beam failure detection (BFD) and link specific candidate beam detection (CBD) for multiple downlink control information (mDCI) mode BFR;
   periodically transmitting, to the UE, a downlink reference signal (DL RS) set, wherein the DL RS set is associated with a link between the UE and the base station and indicates the link specific BFD and the link specific CBD are to be performed for the link, and wherein the DL RS set corresponds to one or more control resource sets (CORESETs) having a same CORESET-poolIndex value;
   receiving, from the UE, a beam failure recovery request (BFRQ), wherein the BFRQ comprises one or more of a failed cell index, a failed CORESET-poolIndex value, a flag to indicate whether a new beam is detected, and a new beam index; and
   in response to determining, based on the BFRQ, that the UE is to apply the new beam to the CORESETs corresponding to a failed CORESET-poolIndex or that the UE is to apply the new beam to physical uplink control channel (PUCCH) resources corresponding to the failed CORESET-poolIndex value, transmitting, to the UE, a BFRQ response indicating to the UE to apply the new beam.

2. The method of claim 1, wherein the DL RS set includes a DL RS that is a channel state information reference signal (CSI-RS) DL RS or a synchronization signal block (SSB) DL RS.

3. The method of claim 2, wherein the DL RS set is configured by radio resource control (RRC) signaling.

4. The method of claim 1 further comprising:
   transmitting, to the UE, an additional DL RS set, the additional DL RS set associated with the link for the link specific CBD.

5. The method of claim 4, wherein the additional DL RS set corresponds to one or more CORESETs having the same CORESET-poolIndex value.

6. The method of claim 1, wherein the BFRQ is received via a media access control control element (MAC CE).

7. The method of claim 1, wherein the BFRQ is received using a physical random access channel (PRACH), wherein the UE is configured with a PRACH resource associated with a DL RS for the link specific CBD, the PRACH resource belonging to a group of resources for the same CORESET-poolIndex value.

8. The method of claim 1, wherein the BFRQ is received using multi-bit PUCCH resources, wherein each PUCCH resource of the PUCCH resources is associated with the same CORESET-poolIndex value.

9. The method of claim 1, wherein the control signaling for the BFR comprises radio resource control (RRC) signaling.

10. A baseband processor of a base station for performing beam failure recovery (BFR) with a user equipment (UE), the baseband processor comprising:

circuitry configured to:
  transmit, to the UE, control signaling for BFR to enable link specific beam failure detection (BFD) and link specific candidate beam detection (CBD) for multiple downlink control information (mDCI) mode BFR;
  periodically transmit, to the UE, a downlink reference signal (DL RS) set, wherein the DL RS set is associated with a link between the UE and the base station and indicates the link specific BFD and the link specific CBD are to be performed for the link, and wherein the DL RS set corresponds to one or more control resource sets (CORESETs) having a same CORESET-poolIndex value;
  receive, from the UE, a beam failure recovery request (BFRQ), wherein the BFRQ comprises one or more of a failed cell index, a failed CORESET-poolIndex value, a flag to indicate whether a new beam is detected, and a new beam index; and
  in response to determining, based on the BFRQ, that the UE is to apply the new beam to the CORESETs corresponding to a failed CORESET-poolIndex or that the UE is to apply the new beam to physical uplink control channel (PUCCH) resources corresponding to the failed CORESET-poolIndex value, transmit, to the UE, a BFRQ response indicating to the UE to apply the new beam.

11. The baseband processor of claim 10, wherein the DL RS set includes a DL RS that is a channel state information reference signal (CSI-RS) DL RS or a synchronization signal block (SSB) DL RS.

12. The baseband processor of claim 11, wherein the DL RS set is configured by radio resource control (RRC) signaling.

13. The baseband processor of claim 10, wherein the circuitry of the baseband processor is further configured to:
  transmit, to the UE, an additional DL RS set, the additional DL RS set associated with the link for the link specific CBD.

14. The baseband processor of claim 13, wherein the additional DL RS set corresponds to one or more CORESETs having the same CORESET-poolIndex value.

15. The baseband processor of claim 10, wherein the BFRQ is received via a media access control control element (MAC CE).

16. The baseband processor of claim 10, wherein the BFRQ is received using a physical random access channel (PRACH), wherein the UE is configured with a PRACH resource associated with a DL RS for the link specific CBD, the PRACH resource belonging to a group of resources for the same CORESET-poolIndex value.

17. The baseband processor of claim 10, wherein the BFRQ is received using multi-bit PUCCH resources, wherein each PUCCH resource of the PUCCH resources is associated with the same CORESET-poolIndex value.

18. The baseband processor of claim 10, wherein the control signaling for the BFR comprises radio resource control (RRC) signaling.

19. A non-transitory computer-readable storage medium including instructions that, when executed by one or more processors of a base station, cause the base station to perform beam failure recovery (BFR) with a user equipment (UE), and further cause the base station to:
  transmit, to the UE, control signaling for BFR to enable link specific beam failure detection (BFD) and link specific candidate beam detection (CBD) for multiple downlink control information (mDCI) mode BFR;
  periodically transmit, to the UE, a downlink reference signal (DL RS) set, wherein the DL RS set is associated with a link between the UE and the base station and indicates the link specific BFD and the link specific CBD are to be performed for the link, and wherein the DL RS set corresponds to one or more control resource sets (CORESETs) having a same CORESET-poolIndex value;
  receive, from the UE, a beam failure recovery request (BFRQ), wherein the BFRQ comprises one or more of a failed cell index, a failed CORESET-poolIndex value, a flag to indicate whether a new beam is detected, and a new beam index; and
  in response to determining, based on the BFRQ, that the UE is to apply the new beam to the CORESETs corresponding to a failed CORESET-poolIndex or that the UE is to apply the new beam to physical uplink control channel (PUCCH) resources corresponding to the failed CORESET-poolIndex value, transmit, to the UE, a BFRQ response indicating to the UE to apply the new beam.

20. The non-transitory computer-readable storage medium of claim 19, wherein the DL RS set includes a DL RS that is a channel state information reference signal (CSI-RS) DL RS or a synchronization signal block (SSB) DL RS.

* * * * *